(12) United States Patent
Hardy

(10) Patent No.: US 11,228,805 B2
(45) Date of Patent: Jan. 18, 2022

(54) CUSTOMIZED COMMERCIAL METRICS AND PRESENTATION VIA INTEGRATED VIRTUAL ENVIRONMENT DEVICES

(71) Applicant: DISH TECHNOLOGIES LLC, Englewood, CO (US)

(72) Inventor: Christofer Hardy, Cheyenne, WY (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 0 days.

(21) Appl. No.: 13/835,292

(22) Filed: Mar. 15, 2013

(65) Prior Publication Data

US 2014/0282647 A1 Sep. 18, 2014

(51) Int. Cl.
*H04N 21/442* (2011.01)
*G06Q 30/02* (2012.01)
*H04N 21/81* (2011.01)

(52) U.S. Cl.
CPC ... *H04N 21/44218* (2013.01); *G06Q 30/0242* (2013.01); *G06Q 30/0267* (2013.01); *H04N 21/44204* (2013.01); *H04N 21/44213* (2013.01); *H04N 21/812* (2013.01)

(58) Field of Classification Search
CPC ........ G02B 2027/0178; G02B 27/0093; G02B 27/017; G02B 2027/0138; G02B 2027/0187; G06F 3/013; G06F 1/163; G06Q 30/02; G06Q 30/0242; G06Q 30/0267; A61B 3/113; H04N 13/0468; H04N 21/44204; H04N 21/44213; H04N 21/44218; H04N 21/812; G02C 7/00

USPC .............................................. 725/12; 348/143
See application file for complete search history.

(56) References Cited

U.S. PATENT DOCUMENTS

| | | | |
|---|---|---|---|
| 8,402,502 B2 * | 3/2013 | Meuninck | H04N 13/341 725/133 |
| 8,544,033 B1 * | 9/2013 | Acharya et al. | 725/12 |
| 8,640,182 B2 * | 1/2014 | Bedingfield, Sr. | H04N 13/194 725/133 |
| 8,719,855 B2 * | 5/2014 | Bedi | G06Q 30/0207 725/19 |
| 8,868,039 B2 * | 10/2014 | Rodriguez | H04M 1/7253 455/411 |
| 8,879,155 B1 * | 11/2014 | Teller | G06K 9/00604 359/630 |
| 8,893,164 B1 * | 11/2014 | Teller | G06Q 30/0252 725/12 |
| 8,918,831 B2 * | 12/2014 | Meuninck | H04N 21/4314 725/133 |
| 9,032,470 B2 * | 5/2015 | Meuninck | H04N 13/356 725/133 |
| 9,232,274 B2 * | 1/2016 | Meuninck | H04N 21/4334 |
| 9,560,406 B2 * | 1/2017 | Meuninck | H04N 21/42203 |
| 9,787,974 B2 * | 10/2017 | Meuninck | H04N 13/161 |
| 10,223,859 B2 * | 3/2019 | Massing | G07F 17/3211 |
| 2007/0168429 A1 * | 7/2007 | Apfel | H04L 67/2814 709/206 |

(Continued)

*Primary Examiner* — Kunal Langhnoja
(74) *Attorney, Agent, or Firm* — Lorenz & Kopf, LLP

(57) ABSTRACT

A method of providing customized commercial content to a user includes providing first commercial content to a user, determining, using an integrated virtual environment device, whether the user substantially viewed the first commercial content, and providing second commercial content to the user based on the first commercial content and whether the user substantially viewed the first commercial content.

16 Claims, 2 Drawing Sheets

(56) References Cited

U.S. PATENT DOCUMENTS

| | | | |
|---|---|---|---|
| 2008/0059994 A1* | 3/2008 | Thornton | G06Q 30/02 725/32 |
| 2011/0161163 A1* | 6/2011 | Carlson | G06Q 30/02 705/14.44 |
| 2011/0221896 A1* | 9/2011 | Haddick et al. | 348/143 |
| 2011/0298702 A1* | 12/2011 | Sakata | G06F 3/013 345/156 |
| 2012/0092328 A1* | 4/2012 | Flaks | G02B 27/017 345/419 |
| 2012/0113235 A1* | 5/2012 | Shintani | H04N 13/337 348/51 |
| 2012/0154277 A1* | 6/2012 | Bar-Zeev | G02B 27/017 345/158 |
| 2012/0154557 A1* | 6/2012 | Perez | H04N 21/25891 348/53 |
| 2012/0293548 A1* | 11/2012 | Perez | G06F 3/012 345/633 |
| 2013/0242262 A1* | 9/2013 | Lewis | G02B 27/0093 351/209 |
| 2013/0293530 A1* | 11/2013 | Perez | G06K 9/00671 345/418 |
| 2014/0040935 A1* | 2/2014 | Gharachorloo | H04N 21/25891 725/23 |
| 2014/0253415 A1* | 9/2014 | Hardy | G06F 3/147 345/2.2 |
| 2014/0253694 A1* | 9/2014 | Zustak | H04N 21/4223 348/51 |
| 2014/0282646 A1* | 9/2014 | McCoy | G06K 9/00597 725/12 |
| 2014/0359654 A1* | 12/2014 | Hardy | H04N 21/4126 725/31 |

\* cited by examiner

CUSTOMIZED COMMERCIAL METRICS AND PRESENTATION VIA INTEGRATED VIRTUAL ENVIRONMENT DEVICES

TECHNICAL FIELD

The present disclosure generally relates to systems and techniques for delivering media content, advertisements, and other content to home entertainment systems. More particularly, the present disclosure relates to the use of integrated virtual environment devices to provide custom commercial content to users.

BACKGROUND

In recent years, it has increasingly become difficult for advertisers to effectively reach viewers. This is due in part to the popularity of digital video recorders and other such devices that allow the user to fast forward through commercials. Furthermore, even when commercial content is displayed to the user, it is not possible to determine whether the user actually viewed the commercial content. That is, the user may choose to leave the environment during the commercial content or may be distracted by other objects or events occurring in the environment. Accordingly, the mere fact that commercial content was provided to a user does not provide an effective indicator of whether that user actually viewed the content.

It is therefore desirable to provide improved systems and methods for determining whether a user has viewed certain commercial content. These and other desirable features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements.

DETAILED DESCRIPTION

In general, the embodiments described herein relate to systems and methods for providing customized commercial content to a user by determining, using an integrated virtual environment device (e.g., a wearable computing device), whether the user substantially viewed certain commercial content in the past (e.g., based on user viewing patterns stored in an external "personality server"). In that regard, the following detailed description of the invention is merely exemplary in nature and is not intended to limit the invention or the application and uses of the invention. Furthermore, there is no intention to be bound by any theory presented in the preceding background or the following detailed description.

Figure 1:
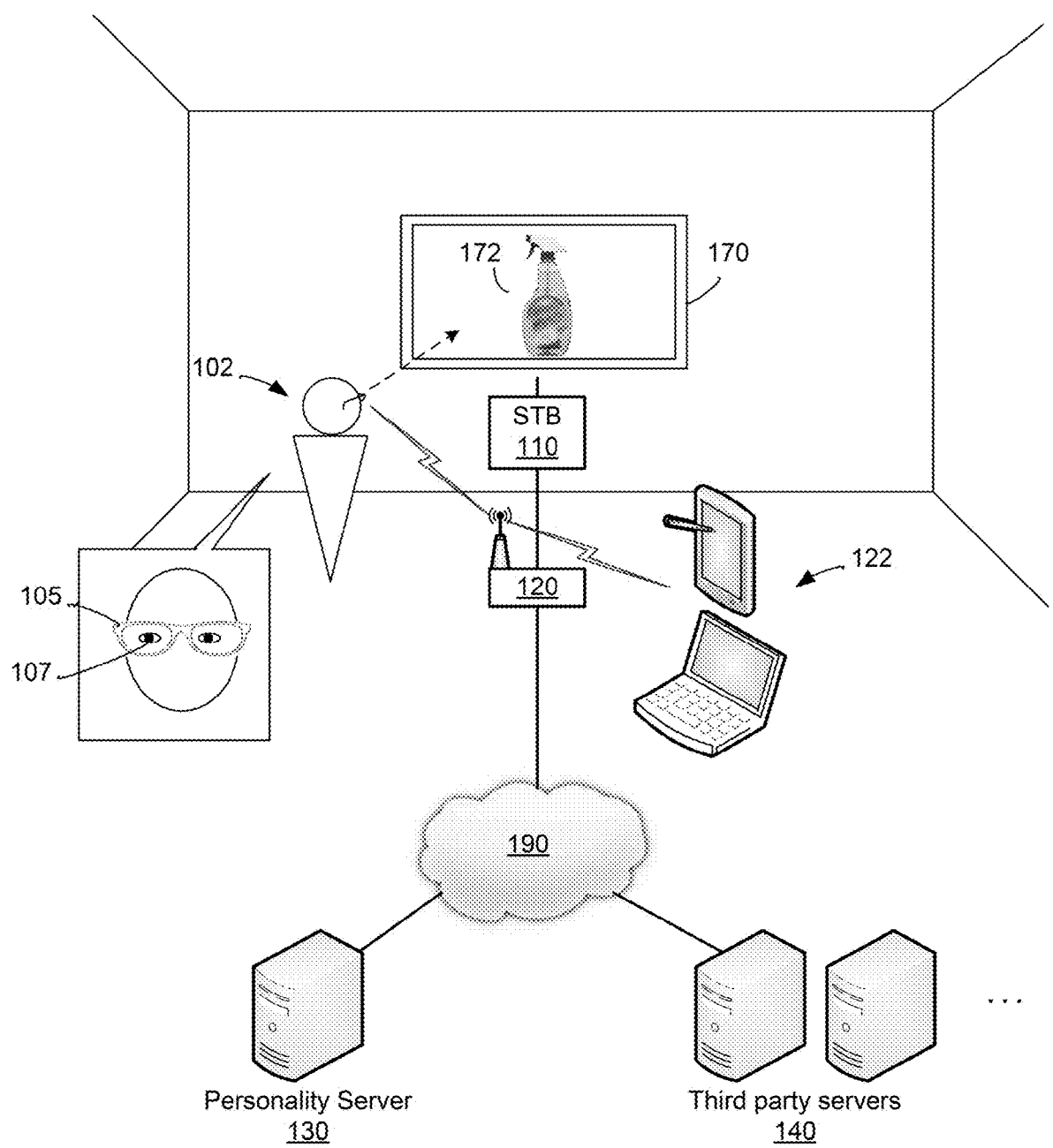
FIG. 1 is a conceptual overview of a content delivery system useful in describing various embodiments.

FIG. 1 presents a conceptual overview of a system in which the present systems and methods may be implemented. As shown, a user 102 is represented schematically as facing a display device 170, for example, a liquid crystal display (LCD), organic light-emitting diode (OLED) display, or other such display. Display device 170 is communicatively coupled (e.g., via any convenient form of wired or wireless communication) to an external component such as a set-top box (STB) 110 and/or other media sources that provide a signal that is processed and ultimately results in an image displayed by the display device 170. At any particular time, the image will typically include media content (e.g., a movie, TV show, or the like) and/or commercial content 172, as illustrated.

Media sources may include a wide range of sources now known or later developed, including, for example, broadcast television, cable television, satellite television, "video-on-demand" or similar sources, digital video disk (DVD) players and other removable media, video camera systems, video game consoles, STB systems, Internet media sources (e.g., YouTube), and the like. The systems and methods described herein may be implemented in conjunction with a variety of home entertainment devices and/or other media components. For example, the present invention may be implemented in the context of a placeshifting system.

User 102 interacts with some form of integrated virtual environment device 105. In general, integrated virtual environment device (or simply "device") 105 comprises any combination of hardware and software capable of determining whether user 102 is, at any particular time, viewing the image (e.g., commercial content 172) presented on display 170. A wide range of devices may be used for this purpose. In recent years, for example, various types of wearable computing devices have become popular, including eyewear that incorporates advanced functionality.

Figure 2:
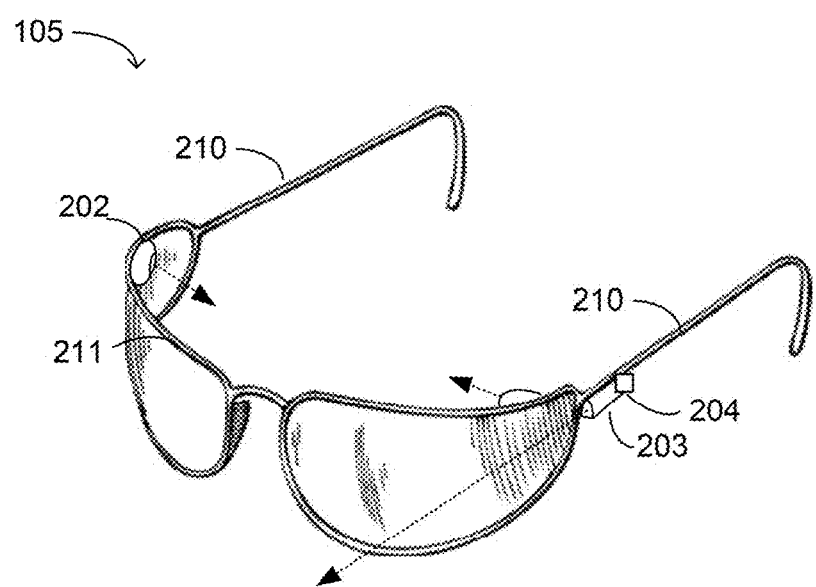
FIG. 2 is a conceptual illustration of an exemplary integrated virtual environment device.

With momentary reference to FIG. 2, for example, device 105 may comprise eyewear (or any other wearable structure) incorporating one or more forward-facing cameras 203 and one or more backward-facing cameras 202 attached to frame front 211, temple components 210, or other portions of the frame. In one embodiment, backward-facing cameras 202 are adapted for tracking the position of one or more of the user's eyes (e.g., eye 107 in FIG. 1) and determining whether the user's eyes are open or closed. Forward facing camera 203 is capable of capturing an image and/or video stream corresponding to whatever is within the user's field of view. Device 105 may also include a microprocessor (204) integrated into the wearable structure, memory, a wireless interface (e.g., Bluetooth, WiFi, etc.), a touch pad, an integrated display screen within the eye-line of the user, an electronic compass, a multi-axis accelerometer, a locationing component (e.g., GPS), as well as other software and hardware traditionally incorporated into mobile computing devices. In general, then, through the use of these components, device 105 is able to determine the direction a user is facing and whether the user is actually watching whatever is within the user's field of view (referred to generally as the user's "viewing patterns").

Referring again to FIG. 1, device 105 is communicatively coupled through one or more networks and/or other communication channels to a personality server 130, which is capable of storing and processing information regarding the viewing patterns of user 102. In one embodiment, as illustrated, device 105 is wirelessly coupled to a conventional IEEE 802.11 (WiFi) access point 120 and/or router that is coupled to network 190 (e.g., the Internet). The embodiments are not so limited, however. Device 105 may, for example, communicate through a Bluetooth connection with a smart-phone or other mobile device, which is then coupled to network 190 through WiFi, a cellular network, or the like.

In general, the present embodiments comprehend any architecture that allows device 105 to communicate with personality server 130.

As depicted in FIG. 1, commercial content 172 may be presented to user 102 via display 170. Through the use of device 105 in conjunction with other components of the system, personality server also receives information regarding whether user 102 is viewing or has viewed particular commercial content. That is, device 105 determines whether user 102 is facing display 170 while his eyes are open and tracking commercial content 172. Device 105 may directly determine that display 170 contains commercial content (e.g., via visual cues in the image, etc.), or STB 110 may coordinate with device 105 to determine whether and to what extent user 102 is viewing particular commercial content 172. For example, the video signal provided to display 170 from STB 110 may itself contain metadata or the like that identifies commercial content.

The commercial content itself may be provided, for example, by third party servers 140, which might also receive information regarding the viewing patterns of user 102. Subsequently, user 102 may be presented with additional commercial content based on previous viewing patterns.

During a typical use case, user 102 is presented with commercial content 172—for example, an advertisement for a particular science fiction series. Device 105 determines whether and to what extent the user has viewed that commercial content (i.e., whether display 170 was within the field of view of device 105). For example, it may be determined that user 102 substantially viewed the commercial content (e.g., viewed a substantial proportion of the entire commercial content). The resulting viewing pattern is then communicated to personality server 130. The viewing pattern information may take any suitable form and include a wide range of information. For example, the viewing pattern might simply note that user 102 viewed the advertisement for the science fiction series for at least a predetermined percentage of the total commercial at a particular time.

After storing and processing the viewing patterns for user 102, personality server 130 might then infer that user 102 is generally interested in science fiction, and may then select additional commercial content (e.g., commercial content regarding another science fiction or fantasy show) to be provided to user 102. In some embodiments, the user's viewing patterns are shared with third parties (e.g., via servers 140) which may then pay a fee to the organization associated with personality server 130.

The commercial content may be provided to display 170 and/or other devices operated by user 102, including, for example, mobile devices 122 and device 105 itself. For example, once personality server 130 determines, through the user's viewing patterns, that user 102 will typically watch commercial content relating to science fiction, related commercial content may then be provided to the user through, for example, social networking sites, search engines, e-mail accounts, etc., to which user 102 subscribes and which may be accessed by user 102 via one or more mobile devices 122. Stated another way, the related commercial content may be provided to the user via a different communication channel than that used to provide the first commercial content.

The examples described above are discussed in the context of a device 105 that is worn by user 102. This embodiments are not so limited, however. One or more devices that are external to user 102 (e.g., mounted within the environment) may also be employed to determine whether and to what extent user 102 is viewing commercial content 172.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A system utilized in conjunction with a server and a display viewable by a user, the system comprising:
   a Set-Top Box (STB) providing a video output signal to the display during operation of the system; and
   an integrated virtual environment device external to the display and in communication with the STB wherein the integrated virtual environment device at least comprises a rear-facing camera configured to track a position of a user's eye and a processor, the integrated virtual environment device further comprising:
   a wearable structure; and
   the processor in communication with an integrated into the wearable structure;
   wherein, during operation of the integrated virtual environment device, the processor:
   determines by capturing, via a forward facing camera affixed to the integrated virtual environment device and positions the forward facing camera when affixed to the integrated virtual environment device in a manner to capture a user's field of view, a video stream within the user's field of view;
   tracks a user's open eye position using the rear-facing camera of the integrated virtual environment device to determine whether the user has viewed a portion of the identified commercial content being captured by the forward facing camera by determination of visual cues in an image of the content captured by the forward facing camera wherein the forward facing camera is also positioned to capture the user's field of view while the user's eyes are tracked in an open eye position to enable determination of whether the user is actually watching commercial content displayed in front of the user; and
   transmits data of visual cues captured in the commercial content over a network and to the server indicating whether the user viewed at least a predetermined portion of the identified commercial content;
   wherein, during the operation of the integrated virtual environment device, the processor identifies when the commercial content is presented on the display and the STB coordinates with integrated virtual environment device to determine whether and to what extent the user is viewing commercial content based upon tracked user's open eye position, and identified commercial content captured.

2. The system of claim 1, wherein the integrated virtual environment device further comprises a front-facing camera which is forwardly facing from the user in communication with the processor, and wherein the processor determines whether the display was within a field of view of the user utilizing the front-facing camera when determining whether the user viewed at least a predetermined portion of the identified commercial content.

3. The system of claim 1, wherein the integrated virtual environment device further comprises the rear-facing camera which is rearwardly facing to the user in communication with the processor, and wherein the processor determines whether the display was within a field of view of the user using the rear-facing camera when determining whether the user viewed at least a predetermined portion of the identified commercial content.

4. The system of claim 1, wherein the integrated virtual environment device further comprises an electronic compass in communication with the processor, and wherein the processor determines in part whether the display was within a field of view of the user utilizing the electronic compass when determining whether the user viewed at least a predetermined portion of the identified commercial content.

5. The system of claim 1, wherein the integrated virtual environment device further comprises a locationing component in communication with the processor, and wherein the processor determines in part whether the display was within a field of view of the user utilizing the locationing component when determining whether the user viewed at least a predetermined portion of the identified commercial content.

6. The system of claim 1, wherein the processor in communication with the integrated virtual environment device further transmits user viewing pattern information to the server in conjunction with the data over the network indicating whether the user viewed at least a predetermined portion of the identified commercial content.

7. The system of claim 1, wherein, during operation of the integrated virtual environment device, the processor identifies when the commercial content is presented on the display based upon visual cues received by the processor.

8. An integrated virtual environment device utilized in conjunction with a server, a display viewable by a user, and a Set-Top Box (STB) providing a video output signal to the display, the integrated virtual environment device comprising:
   a wearable structure;
   a processor disposed in the virtual environment device and in communication with an integrated into the wearable structure; and
   a rear-facing camera coupled to the wearable structure in communication with the processor wherein the rear-facing camera is configured to track a position of a user's eye;
   wherein, during operation of the integrated virtual environment device, the processor:
     identifies, based in part upon data of visual cues contained in the commercial content transmitted from the STB, when commercial content is presented on the display;
     when identifying that commercial content is presented on the display, determines by capturing, via a forward facing camera affixed to the integrated virtual environment device and a positioning of the forward facing camera when affixed to the integrated virtual environment device in a manner to capture a user's field of view, by the forward facing camera a video stream within the user's field of view and by tracking a user's open eye position using the rear-facing camera of the integrated virtual environment device to determine whether the user has viewed a portion of the identified commercial content by a direction that a user is facing;
     track a user's open eye position using the rear-facing camera of the integrated virtual environment device to determine whether the user has viewed a portion of the identified commercial content being captured by the forward facing camera wherein the forward facing camera is positioned to capture the user's field of view while the user's eyes are tracked in an open eye position;
   wherein, during the operation of the integrated virtual environment device, the processor identifies when the commercial content is presented on the display and the STB coordinates with the integrated virtual environmental device to determine whether and to what extent the user is viewing the commercial content.

9. The integrated virtual environment device of claim 8, further comprising an electronic compass, the processor utilizing data provided by the electronic compass to determine when the user is actively viewing advertising content presented on the display.

10. The integrated virtual environment device of claim 8, wherein the wearable structure comprises an eyeglass frame.

11. The integrated virtual environment device of claim 8, further including an IEEE 802.11 interface communicatively coupled to the processor.

12. The integrated virtual environment device of claim 8, further including an interface communicatively coupled to the processor.

13. A method utilizing an integrated virtual environment device worn by a user, the method performed in conjunction with a processor integrated with the virtual environment device and in communication with a server, a display external to the integrated virtual environment device and viewable by the user, and a Set-Top Box (STB) providing a video output signal to the display, the method comprising:
   configuring the integrated virtual environment device with a rear-facing camera configured to track a position of a user's eye, and a forward facing camera to capture commercial content displayed within the user's field of view;
   identifying, by the processor integrated at the virtual environment device, based upon visual cues in an image of captured commercial content, when the commercial content is presented on the display; and
   when the commercial content is presented on the display device, determining, by capturing, via the forward facing camera, a video stream within a user's field of view and, by tracking a user's open eye position using the rear-facing camera of the integrated virtual environment device for determining whether the user has viewed a portion of the identified commercial content being captured by the forward facing camera by determination by the visual cues contained in the captured commercial content that is also viewed by the forward facing camera positioned to capture the user's field of view while the user's eyes are tracked in an open eye position;
   wherein, during operation of the integrated virtual environment device, the processor integrated at the virtual environment device identifies when the commercial content is presented on the display and the STB coordinates with the integrated virtual device to determine whether and to what extent the user is viewing the identified presented commercial content based upon visual cues of the image received by the integrated virtual environment device, and contained in the video output signal provided to the display by the STB.

14. The method of claim 13, wherein determining comprises determining, at the processor, whether the user has viewed at least a predetermined portion of the identified commercial content based on eye-tracking performed by the integrated virtual environment device.

15. The method of claim 13, wherein determining comprises determining, at the processor, whether the user has viewed at least a predetermined portion of the identified commercial content based an electronic compass provided within the integrated virtual environment device.

16. The method of claim 13, further comprising:
generating user viewing pattern information by the processor.

* * * * *